Patented Feb. 12, 1946

2,394,960

UNITED STATES PATENT OFFICE 2,394,960

PROCESS FOR POLYMERIZING ETHYLENE

Howard S. Young, Fairville, Pa., assignor to E. I. du Pont de Nemours & Company, Wilmington, Del., a corporation of Delaware No Drawing. Application July 22, 1941, Serial No. 403,534

3 Claims. (Cl. 260—84)

This invention relates to polymerization processes and more particularly to polymerizations involving ethylene, either alone or together with other polymerizable organic materials.

Various proposals have been made for polymerizing organic compounds either singly or mixed with other polymerizable organic substances. Processes for polymerizing liquid organic compounds in which the said compounds are subjected to polymerizing conditions, in the presence of water, dispersing agents and catalysts are known.

In the application of this prior art method to the polymerization of ethylene, it has been found that the material of which the reaction vessel is constructed has a definite deleterious effect upon the rate of reaction and yield of polymer. Thus, for example, when carrying on the polymerization of ethylene in the presence of peroxides in ordinary iron or steel vessels, it has been found that the rate of reaction is slow and the yield of polymer is low. Furthermore, the corrosion of the reaction vessels is sufficiently pronounced to give products which contain undesirable quantities of impurities resulting from attack upon the steel or iron vessels. This is undesirable because the polymerization of ethylene, either alone or together with other materials, may be carried out at high pressures and elevated temperatures and any weakness of such vessels due to corrosion might cause dangerous situations to exist, particularly after extended operations.

It is an object of the present invention to provide a new and improved method for polymerizing ethylene, alone or in admixture with other polymerizable compounds, which is free from the disadvantages of the prior art.

It is another object to provide a process for polymerizing ethylene, alone or in admixture with other polymerizable organic compounds, which is adaptable to large scale operation.

It is a further object of the present invention to provide a process for carrying on the polymerization of ethylene alone or in admixture with other polymerizable compounds in the presence of peroxide-type catalysts in such a way that the product obtained is free from impurities.

It is an additional object of the present invention to provide a new and improved process for polymerizing ethylene, either alone or admixed with other polymerizable organic compounds, by subjecting such materials to polymerizing conditions in the presence of an aqueous medium containing a peroxide-type catalyst in a vessel constructed of stainless steel.

Other objects and advantages of the invention will be apparent from the following description.

The above and other objects are attained according to this invention by carrying on the polymerization of ethylene, preferably with agitation, in a medium which may consist of water or which may consist of water and an organic liquid, in the presence of a peroxide compound, under pressure in excess of atmospheric and temperatures in excess of 40° C., the polymerization being carried on in a pressure-resistant reaction vessel constructed of or lined with stainless steel. Thus, for example, there may be used such materials as the so-called "18–8" stainless steels which contain 18–20% chromium and 8–14% nickel. Stainless steels may also be used which contain 2–4% molybdenum. By stainless steel it is meant to include generally any of the well-known alloy steels containing chromium with or without nickel, whether additionally modified or not by other materials such as molybdenum, columbium, phosphorus, manganese, and the like. I have discovered that by the use of such materials of construction, it is possible to carry on the polymerization of ethylene in an aqueous medium, either alone or together with other polymerizable organic materials, and that the rate of reaction and yield of polymer is much improved over the prior art. I have also discovered that by using such materials the polymerization can be carried on without serious corrosion of the reaction vessel and this operates to give products having improved color.

In practicing this invention it is generally preferred to use water alone as the menstruum as this operates to give polymers of higher molecular weight, as measured by intrinsic viscosity in solutions, than are otherwise obtained and it avoids the need for solvent recovery, an otherwise necessary step for economical operation. If desired, however, part of the water may be replaced by an organic compound, preferably a volatile liquid organic compound such as isooctane, toluene, butyl acetate, ethyl ether, n-hexane, cyclohexane, cyclohexanol, methanol, ethanol, butanol, metabromtoluene, petroleum ether and the like.

Although it is not necessary to use surface active agents addition of such compounds is sometimes desirable, and suitable examples are the water-soluble salts of the higher alkyl sulfates and sulfonates such as sodium tetradecylsulfate, sodium dodecyl sulfate, sodium pentadecane-8 sulfonate, alkali metal salts of sulfonated mineral oils, Turkey red oil, and the like.

The range of temperatures within which this invention may be practiced is wide, temperatures of from 40° C. to 350° C. covering the desired field, although it is preferable to maintain the temperature at a point below the critical temperature of water and above the temperature at which ethylene hydrates form. Within this range the preferred field of operation is from about 60 to 250° C. In making polymers of ethylene with other polymerizable materials the particular temperatures used are influenced by the polymerizing characteristics of the other components of the polymer and by the particular catalyst used but as a rule the preferred temperature ranges will fall within the 60 to 250° C. temperature range.

The particular pressure used in any case depends upon the polymerizing characteristics of the reactants. Pressures in the range of from atmospheric up to 3000 atmospheres and above may be employed although, preferably, pressures of 300 to 1500 atmospheres are employed. The upper pressure which may be employed is restricted only by the mechanical strength of commercially available equipment.

In the polymerization of ethylene in an aqueous medium, according to this invention, it is desirable to use relatively small amounts of catalytic materials. As such catalysts a wide range of polymerization-favoring catalysts may be employed such, for example, as peroxide compounds, by which term is meant compounds which are either formed by the action of hydrogen peroxide on ordinary acids or else give rise to hydrogen peroxide on treatment with dilute sulfuric acid. Examples of such compounds in addition to those specifically disclosed in the examples are persuccinic acid, lauroyl peroxide, tetralin peroxide, urea peroxide, butyryl peroxide, acetyl peroxide, acetyl benzoyl peroxide, peracetic acid, alkali metal and ammonium persulfates, perborates and percarbonates, etc. There may also be employed combinations of persulfates with borax or persulfates with alkaline phosphates such as may be produced by adding sodium hydroxide to phosphoric acid, until a pH of about 9.0 is obtained. When employing a persulfate catalyst, it is recommended that the pH be maintained in the range of 7 to 11, this particular catalyst showing the best polymerization-favoring characteristics under such conditions, in the absence of an emulsifying agent. The amount of catalyst used may vary over a wide range but, generally speaking, it is of the order of 0.1% or more (based on the weight of the total liquid).

The following examples will illustrate how the invention may be practiced:

*Example 1*

A stainless steel reaction vessel is charged with 160 parts of water, 40 parts of isooctane, 5 parts of a 50% aqueous solution of the sodium salt of sulfated 9,10-octadecenyl acetate and 1 part of benzoyl peroxide. The tube is closed and pressured with ethylene to 290-340 atmospheres at a temperature of 70-75° C. The reaction vessel is agitated for 8 hours at the temperature and pressures given and during this time a pressure drop of about 50 atmospheres is observed. The vessel is then allowed to cool, bled of excess ethylene, opened, and the contents discharged. The solid residual polymer is filtered, washed thoroughly to free it of dispersing agent, and dried.

There is thus obtained 13 parts of a polymeric material which evidences no contamination as shown both by color and by failure of hydrochloric acid to extract soluble iron compounds from the polymer.

*Example 2*

Into a stainless steel vessel of about 400 cc. capacity there is charged 150 parts of distilled water, 0.5 part of sodium persulfate, 9 parts of a 32% water solution of the sodium salts of sulfonates of 16 carbon atom hydrocarbons and 3 parts of borax.

The tube is closed, placed in a shaking machine, evacuated, flushed with ethylene to remove air, and agitation started.

After evacuation, ethylene containing less than 5 parts per million oxygen is introduced to a pressure of about 600 atmospheres at room temperature. The reaction vessel is then heated at 59-68° C. for 9½ hours with a resultant pressure of 900-1025 atmospheres. The pressure is maintained by periodic additions of ethylene. A pressure drop of 525 atmospheres is observed during the reaction period.

At the expiration of this reaction period 35 parts of ethylene polymer is removed. From the final product tough films can be hot-pressed and strong filaments can be extruded. The product shows no contamination as evidenced by both color and failure of hydrochloric acid to extract soluble iron compounds from the polymer.

*Example 3*

A stainless steel reaction vessel is charged with 90 parts of water, 10 parts of vinyl propionate, and 0.2 part of benzoyl peroxide. The pH of this mixture is 3.4. The tube is closed, evacuated, placed in a shaker machine, pressured with ethylene, and heating and agitation started. In a reaction time of 10 hours, during which the temperature is maintained at 79° to 85° C. and the pressure at 845 to 965 atmospheres, the total observed pressure drop is 320 atmospheres. The tube is cooled, bled of excess ethylene, opened, and the contents discharged. Unreacted vinyl propionate is separated by steam distillation, the interpolymer filtered, and dried in an oven at 70° C. There is thus obtained 65 parts of vinyl propionate/ethylene interpolymer which melts at 111.5° to 113° C. and which has an intrinsic viscosity of 1.37 (measured as a 0.125% solution in xylene at 85° C.).

*Example 4*

A stainless steel lined reaction vessel is charged with 80 parts of water, 20 parts of dimethyl maleate, and 0.2 part of benzoyl peroxide. The pH of the mixture is 3.3. The tube is closed, evacuated, placed in a shaker machine, pressured with ethylene and heating and agitation started. In a reaction time of 10.5 hours during which the temperature is maintained at 84° to 86° C. and the pressure at 880 to 1000 atmospheres, the total pressure drop is 165 atmospheres. The vessel is cooled, bled of excess ethylene, opened, and the contents discharged. Unreacted dimethyl maleate is separated by steam distillation, the polymer filtered, and dried at 70° C. There is thus obtained 38 parts of a product which has an intrinsic viscosity of 0.46 and which contains 68.9% carbon and 10.2% hydrogen. From this analysis it may be calculated that the interpolymer has a dimethyl maleate to ethylene mole ratio of 1 to 5.8.

Example 5

A stainless steel lined reaction vessel is charged with 80 parts of water, 20 parts of dimethyl fumarate and 0.2 part of benzoyl peroxide. The pH of this mixture is 2.4. The vessel is closed, evacuated, placed in a shaker machine, pressured with ethylene, and heating and agitation started. In a reaction time of 10.75 hours, during which the temperature is maintained at 94° to 96° C. and the pressure at 880 to 1000 atmospheres, the observed pressure drop totals 540 atmospheres. The vessel is cooled, bled of excess ethylene, opened, and the contents discharged. The interpolymer is filtered, suspended in denatured alcohol to extract unreacted dimethyl fumarate, filtered, and dried at 70° C. There is thus obtained 47 parts of dimethyl fumarate-ethylene interpolymer having an intrinsic viscosity of 1.15 and containing 76% carbon and 11.6% hydrogen. From this analysis it may be calculated that the interpolymer has a dimethyl fumarate to ethylene mole ratio of 1 to 13.8. The product can be pressed into films which are characterized by good pliability.

Example 6

A stainless steel lined reaction tube is charged with 80 parts of de-aerated water, 20 parts of methyl methacrylate and 0.4 part of benzoyl peroxide. The pH is adjusted from 5.2 to 3.2 with formic acid. The tube is closed, evacuated to remove residual air, placed in the shaker machine, thermocouples fitted and connection to high pressure ethylene established. The tube is pressured to 600 atmospheres with ethylene containing 200 parts per million of oxygen. Throughout a reaction time of 10.4 hours, during which the temperature is maintained at 79–83° C. and the pressure at 840–975 atmospheres, the observed pressure drop totaled 455 atmospheres. After cooling and bleeding of excess ethylene the tube is emptied and the product filtered, washed and dried. There is thus obtained 53 parts of an interpolymer which has an intrinsic viscosity of 1.4 (0.125% in xylene at 85° C.) and a methyl methacrylate/ethylene mole ratio of 1:4.4 as calculated from analyses, 84.21% C., 13.62% H.

Example 7

A stainless steel reaction vessel of 400 cc. capacity is charged with 20 grams of methyl methacrylate, 80 grams of de-aerated water, 1.0 gram of borax and 0.2 gram of sodium persulfate. The pH of this charge is 9.2. The vessel is closed, evacuated to remove residual air, placed in the shaker machine and suitable service connections established. Heating and agitation are started and during a reaction time of 10.25 hours throughout which the temperature is maintained at 74 to 75° C. and the pressure at 860 to 960 atmospheres, the total observed pressure drop is 170 atmospheres. The vessel is cooled, bled of excess ethylene, opened and the reaction mixture discharged. This has a pH of 8.5. The polymer is separated from monomer by steam distillation of the latter. The polymer is then filtered from water and dried. There is thus obtained 14.3 grams of a methyl methacrylate-ethylene interpolymer whose analysis (68.9% C, 9.6% H) shows a methyl methacrylate-ethylene mole ratio of 1:1.9. This can be pressed to clear tough films which have good cold drawing properties.

Example 8

A stainless steel liner reaction vessel of about 400 cc. capacity is charged with 20 parts of methyl methacrylate, 80 parts of boiled water and 0.15 part of ammonium persulfate. The pH of this mixture is 3.5. The vessel is closed, evacuated to remove air, placed in a shaker machine and suitable service connections established. The tube is then pressured to 600 atmospheres with ethylene, and heating and agitation started. Throughout a reaction time of 10.75 hours, during which the temperature is maintained at 75° to 76° C. and the pressure at 885 to 960 atmospheres, the observed pressure drop totals 100 atmospheres. The vessel is cooled, bled of excess ethylene, opened, and the reaction mixture discharged. The pH of the reaction mixture is 2.8. The reaction mixture is steam distilled to remove unreacted methyl methacrylate, the polymer coagulated with 10% aluminum sulfate solution, washed free of salt, and dried. There is thus obtained 17.4 parts of polymer having an intrinsic viscosity of 1.4 (measured as a 0.125% solution in xylene at 85° C.).

Example 9

A stainless steel lined reaction vessel of 400 cc. capacity is charged with 20 parts of ethyl methacrylate, 80 parts of de-aerated water, 1 part of the sodium salt of sulfonated white oil, and 0.2 part of potassium persulfate. The pH of this mixture is 8.2. The vessel is closed, evacuated to remove air, placed in a shaker box and suitable service connections established. The vessel is pressured to 600 atmospheres with ethylene, and heating and agitation started. During a reaction time of 10.75 hours, throughout which the temperature is maintained at 74° to 77° C. and the pressure at 860 to 960 atmospheres, the observed pressure drop totals 360 atmospheres. The vessel is cooled, bled of excess ethylene, opened, and the contents discharged. The reaction mixture has a pH of 3.8. The polymer is freed of unreacted ethyl methacrylate by steam distillation and then coagulated with aluminum sulfate. The polymer thus obtained is washed and dried on a rubber mill. There is thus obtained 36.5 parts of product having an intrinsic viscosity of 1.2 (measured as a 0.125% solution in xylene at 85° C.). The product is characterized by being a strong, extensible elastomer having a relatively small amount of plasticity.

Example 10

A stainless steel lined reaction vessel of about 1300 cc. capacity is charged with 40 parts of vinyl acetate, 260 parts of boiled water, 2 parts of the sodium salt of sulfonated white oil, and 0.6 parts of benzoyl peroxide. The pH of this mixture is adjusted to 3.5 by addition of a few drops of dilute formic acid. The vessel is closed, evacuated to remove air, placed in a heater in a rocking mechanism, and suitable service connections established. The vessel is pressured to 600 atmospheres with ethylene, and heating and agitation started. During a reaction time of 11 hours, throughout which the temperature is maintained at 72° to 77° C. and the pressure at 850 to 950 atmospheres, the observed pressure drop totals 320 atmospheres. The vessel is cooled, bled of excess ethylene, opened, and the reaction mixture discharged. This mixture has a pH of 3.5. The polymer is separated from unreacted vinyl acetate by steam distillation, washed free of dispersing agent, and dried. There is thus obtained 84 parts of a polymer having an intrinsic viscosity of 1.8 (measured as a 0.125% solution in xylene at 85° C.). Analysis of the product shows it to contain 8.24% carbon, 13.6% hydrogen from which it may be calculated that the mole ratio of vinyl acetate to ethylene is 1 to 24.3.

Although the examples illustrating polymerization of ethylene with other materials have been restricted to polymers of ethylene with vinyl propionate, vinyl acetate, dimethyl fumarate and maleate, methyl and ethyl methacrylate, nevertheless, it should be understood that the processes of this invention may be employed also in polymerizing ethylene with other polymerizable substances. Thus, for example, ethylene can be polymerized, according to this invention with: other mono-olefins, e. g. propylene, butylene, halogenated ethylenes, e. g. 1,1 and 1,2-dichloroethylenes, 2-chloropropene-1, tetrafluorethylene; vinyl ethers, ketones and esters, such as methyl and propyl vinyl ethers, methyl and ethyl vinyl ketones, vinyl chloroacetate, vinyl chloride, vinyl acetate, vinyl propionate, N-vinyl phthalimide, vinyl thiol acetate, methyl vinyl thioether, methyl vinyl sulfone, vinyl carbazole, vinyl sulfonic esters; stilbene; styrene; acrylic and methacrylic acids and their amides, nitriles, and esters such as methylene diacrylate and dimethacrylate, ethyl, propyl, butyl and amyl acrylates and methacrylates; alpha-haloacrylic acids and esters, e. g., methyl alpha-chloroacrylate; esters of crotonic acid and itaconic acids, e. g., methyl and ethyl crotonates and itaconates; dienes such as butadiene, isoprene, chloro-2-butadiene-1,3; terpenes, e. g., limonene, camphene.

In commercial practice a continuous process offers advantages of efficiency, more accurate control, and especially in the case of polymers of ethylene with other materials, better possibilities for adjusting the ratio of polymerizing ingredients. For most efficient operation in a continuous process a rapid rate of reaction is necessary. With many polymers and especially with ethylene alone the most rapid polymerization is obtained when operating with organic peroxide catalysts at a pH of from 3.5 to 6.

The essential conditions used in the continuous operation, technique of agitation, control of pH, isolation of finished products, and recirculation of unreacted materials may be varied widely. For example, ethylene under pressure may be continuously introduced into water containing a polymerization favoring catalyst such as a peroxide and the resulting mixture maintained in a turbulent state, passed under pressure through a reactor in which the time of contact and temperature are controlled to effect the required degree of polymerization. The resulting content of the reaction vessel may be passed into an area of lower pressure to recover unreacted ethylene and the polymer may be isolated by filtration. When polymerizing ethylene with a liquid unsaturated compound the latter can be introduced continuously with the water phase. When it is desired to polymerize continuously two unsaturated gases, both having critical temperatures below the operating temperature, e. g. ethylene and tetrafluoroethylene, the gases may be premixed in the desired proportions and brought into contact with the water phase under pressure or the gases may be injected separately into the water phase in the desired proportions.

For rapid polymerization it is necessary to provide intimate contact between all the reactants by agitation. By the term agitation as used herein it is intended to include any means for accomplishing intimate contact between the reactants, e. g. rapid stirring, turbulence in a continuous flow process, atomization, shaking, or efficient bubbling of the gas or gases through the water phase.

Various changes may be made in the details and preferred embodiment of this invention without departing therefrom or sacrificing the advantages thereof.

I claim:

1. In a process of polymerizing ethylene to high molecular weight solid polymers, the step which comprises subjecting the ethylene to polymerization in the presence of water and a peroxide catalyst at a pressure between 300 and 1500 atmospheres at a temperature between 40 and 350° C. and in a reaction zone all parts of which that contact the reaction mixture during the reaction being stainless steel containing from 18 to 20% chromium, 8 to 14% nickel, the remainder being essentially iron.

2. In a process of interpolymerizing ethylene with methyl methacrylate, the steps which comprise charging a stainless steel reaction vessel with 80 parts of de-aerated water, 20 parts of methyl methacrylate and 0.4 part of benzoyl peroxide, adjusting the reaction mixture to a pH of 5.2 to 3.2 with formic acid and pressuring the vessel with 600 atmospheres of ethylene containing approximately 200 parts per million of oxygen, conducting the reaction at a temperature between 79 and 83° C. and at a pressure between 840 and 975 atmospheres, in a reaction zone of "18–8" stainless steel, and separating the interpolymer of ethylene and methyl methacrylate from the reaction mixture.

3. In a process of polymerizing ethylene to high molecular weight solid polymers, the step which comprises subjecting the ethylene to polymerization in the presence of water and a peroxy catalyst at a pressure between 300 and 3000 atmospheres at a temperature between 40 and 350° C. and in a reaction zone all parts of which that contact the reaction mixture during the reaction being chromium-nickel stainless steel.

HOWARD S. YOUNG.